Patented Sept. 26, 1922.

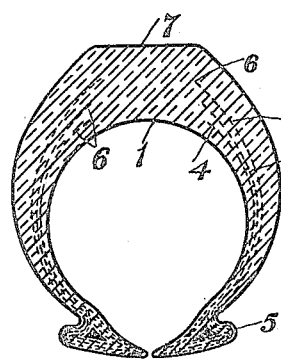
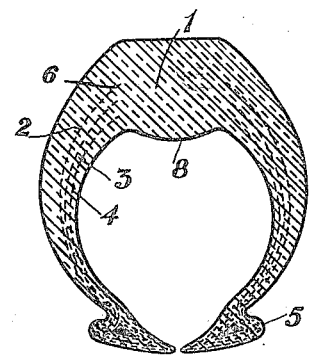
FIG.1.  FIG.2.
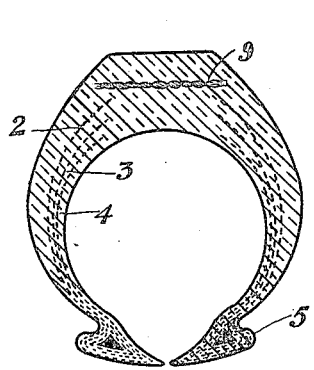
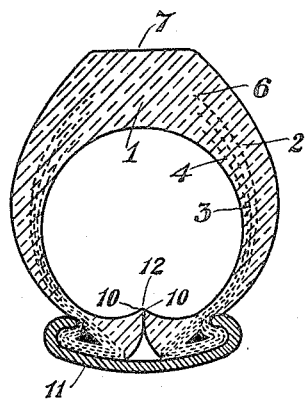
FIG.3.  FIG.4.
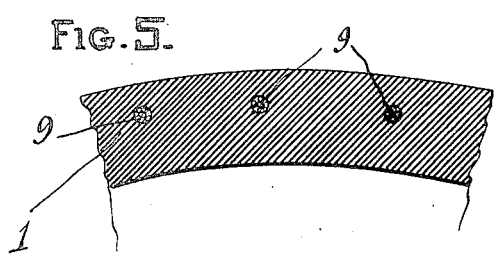
FIG.5.

1,430,236

UNITED STATES PATENT OFFICE.

JOHN GEORGE AULSEBROOK KITCHEN, OF LANCASTER, ENGLAND.

PNEUMATIC TIRE.

Application filed September 25, 1920. Serial No. 412,858.

(GRANTED UNDER THE PROVISIONS OF THE ACT OF MARCH 3, 1921, 41 STAT. L., 1313.)

*To all whom it may concern:*

Be it known that I, JOHN GEORGE AULSEBROOK KITCHEN, a subject of the King of Great Britain and Ireland, residing at Lancaster, in the county of Lancaster, England, have invented new and useful Improvements in Pneumatic Tires (for which I have filed application in England September 24, 1919, Patent No. 142,023), of which the following is a specification.

This invention relates to pneumatic tires of the kind in which the crown portion is made circumferentially elastic or extensible.

The object of this invention is to produce an efficient tire of this kind.

According to my invention, the inextensible reinforcements of the side walls of the tire terminate in the sides of the crown portion which is of solid elastic indiarubber, the outer annular edge margins of the reinforcements being divided into leaves which are separated or splayed out so as to obtain a firm anchorage in the crown portion. The crown portion is made sufficiently thick in the centre of the arch or tread to withstand the required pressure and to allow for fair wear and tear. It is also formed sufficiently thick at the sides so that the before-mentioned reinforcements can be efficiently anchored therein. The elastic material of the crown portion is mainly relied upon for strength circumferentially, and in the transverse direction, across the tread, the material may be reinforced in such a manner as not to interfere with circumferential or longitudinal elasticity or to provide a continuous reinforcement with that of the side walls.

In some cases I may form the inside of the crown with a convex face towards the base of the tire so that as the tread surface becomes worn down, the internal pressure will cause the tread to lift circumferentially and thereby maintain the same diameter.

The drawings attached hereunto show the principle of construction of my improved tire. The several figures represent cross sections. Figure 1 shows the arrangement of the fabric foundation or canvas insertions in my improved tire. Figure 2 shows a similarly constructed tire with a convex surface on the inside of the crown. Figure 3 also shows a similar construction with inextensible insertions at intervals apart longitudinally, across the crown. Figure 4 shows a tire constructed according to my invention and adapted for use without a separate air chamber or tube. Figure 5 is a view showing a longitudinal section of a portion of a tire, illustrating the spaced reinforcing members.

In the several illustrations, three plies or insertions of reinforcing fabric such as canvas, are represented but the number will depend upon circumstances such as the character of the insertions and the size of the tire.

Referring first to Figure 1 of the drawings, my improved tire is made with a thick or deep crown 1 of solid elastic material such as commercial indiarubber, the thickness depending upon the size of the tire. It is sufficiently thick to resist undue expansion from internal pressure and to provide for fair wear and tear. The inextensible foundation or reinforcement consisting of canvas or its equivalent is represented by three plies or insertions 2, 3 and 4 shown by the dotted lines, which extend from the beaded edges 5 upwards and are anchored in the sides of the crown preferably with their upper edge margin 6 at each side of the tire well separated with the elastic indiarubber. There is thus no cross arching of fabric plies across and longitudinally round the crown which remains elastic, and not inextensible as it would be if the continuous canvas reinforcement of the side walls passed also across the crown. This construction also facilitates repair in the case of a puncture which will immediately close up if small and if large can be plugged and rendered homogeneous again with similar material.

In building up the tire so made, the crown may be formed in layers before being vulcanized, the inner plies 4 of fabric being first laid upon a thin bed of rubber over a former; then a second bed of rubber laid over the first plies 4 of canvas; afterwards other plies 3 of canvas and over these a third bed, and lastly in this case, other plies 2 again of canvas and over these an outer layer of rubber forming the outside surface of the tire, the edges of the plies of one side wall being separated from those of the other side of the tire as shown. Another way in which this tire may be made, is by applying the canvas in the usual way over the crown and then cutting it away where it passes over the crown, before the tire is vulcanized. The lower part of the tire, that is to say the edges, may be formed separately in the ordinary way. After the tire is so built up it is vulcanized in the usual way.

Referring now to Figure 2 of the drawings; the inside surface of the crown is formed convex as shown at 8, so that as the tread surface 7 becomes worn and the depth of the crown becomes thinner, expansion of the tire will be facilitated, due to the elastic or extensible nature of the crown and the fact that the air chamber tends to take a circular form in cross section. It will be understood upon reflection that the side walls of the tire being inextensible and thinner than the crown, cannot expand apart under the internal pressure alone without extending to some extent the width of the crown, while the same pressure tends to lift the crown. The tire being properly proportioned will, as the tread becomes worn, expand circumferentially.

In some cases the tire may have insertions 9 of inextensible fabric of twisted or woven fibre such as canvas or cord as shown in Figure 3. These are embedded in the crown and isolated from the reinforcement of the side walls by the elastic material of the crown and are disposed at regular intervals apart circumferentially or longitudinally round the tire. They serve to prevent the elastic material of the crown from splitting in the centre of the arch while they do not prevent a certain amount of lateral expansion of the crown owing to their not being joined to the reinforcement of the side walls.

In Figures 1, 2 and 3, the tires represented are adapted for separate air chambers. In Figure 4, the tire illustrated is adapted for use without a separate air chamber, being formed with annular lips 10 of elastic indiarubber which, when the tire is forced into the rim 11, press close together, and make an airtight joint at 12. When the tire is inflated, the internal pressure tends to make the joint tighter. The inflating valve or tube is not indicated in the drawing, but it may be of the ordinary kind and applied in the ordinary way, say to one side of the longitudinal joint. This method of making a close joint and dispensing with a separate air chamber is well known and does not form part of this invention.

The improvements are equally applicable to tires provided with wired edges, and also to tires in which the base is clamped to the sides of the felloe and also to what are known as "single tube" tires of the "hose-pipe" class.

The property of longitudinal expansion in the crown, due to dispensing with a continuous reinforcement both longitudinally and transversely, as employed in my improved tire, does not tend to cause the base of the tire to contract upon the rim when the tire is inflated and is not intended to do so.

I claim:—

1. A pneumatic tire having a thickened crown of elastic rubber, and side walls, annular reinforcing layers of flexible material in said walls having their outer edges separated and terminating at opposite sides of the center of the tire, and an annular series of longitudinally spaced reinforcing members disposed transversely of the tire between the tread and said separated edges of the reinforcing layers.

2. A pneumatic tire having a thickened crown of elastic rubber, a flat annular tread, and side walls having beads, annular reinforcing layers of flexible material in said side walls having their inner edges converging in said beads and their outer edges diverging and terminating at opposite sides of the tire center, and an annular series of longitudinally spaced reinforcing members disposed transversely of the tire between the tread and said diverging edges.

3. A tire having a thickened crown of elastic rubber, a flat annular tread, and side walls having beads, annular layers of fabric having their inner edges converging in said beads and their outer edges diverging and terminating at opposite sides of the tire center, and an annular series of longitudinally spaced members of woven fibre disposed transversely of the tire between the tread and said diverging edges.

JOHN GEORGE AULSEBROOK KITCHEN.